E. A. SPERRY.
SPEED AND DIRECTION INDICATOR FOR AIRCRAFT.
APPLICATION FILED MAY 12, 1914.
1,274,622.
Patented Aug. 6, 1918.
2 SHEETS—SHEET 1.
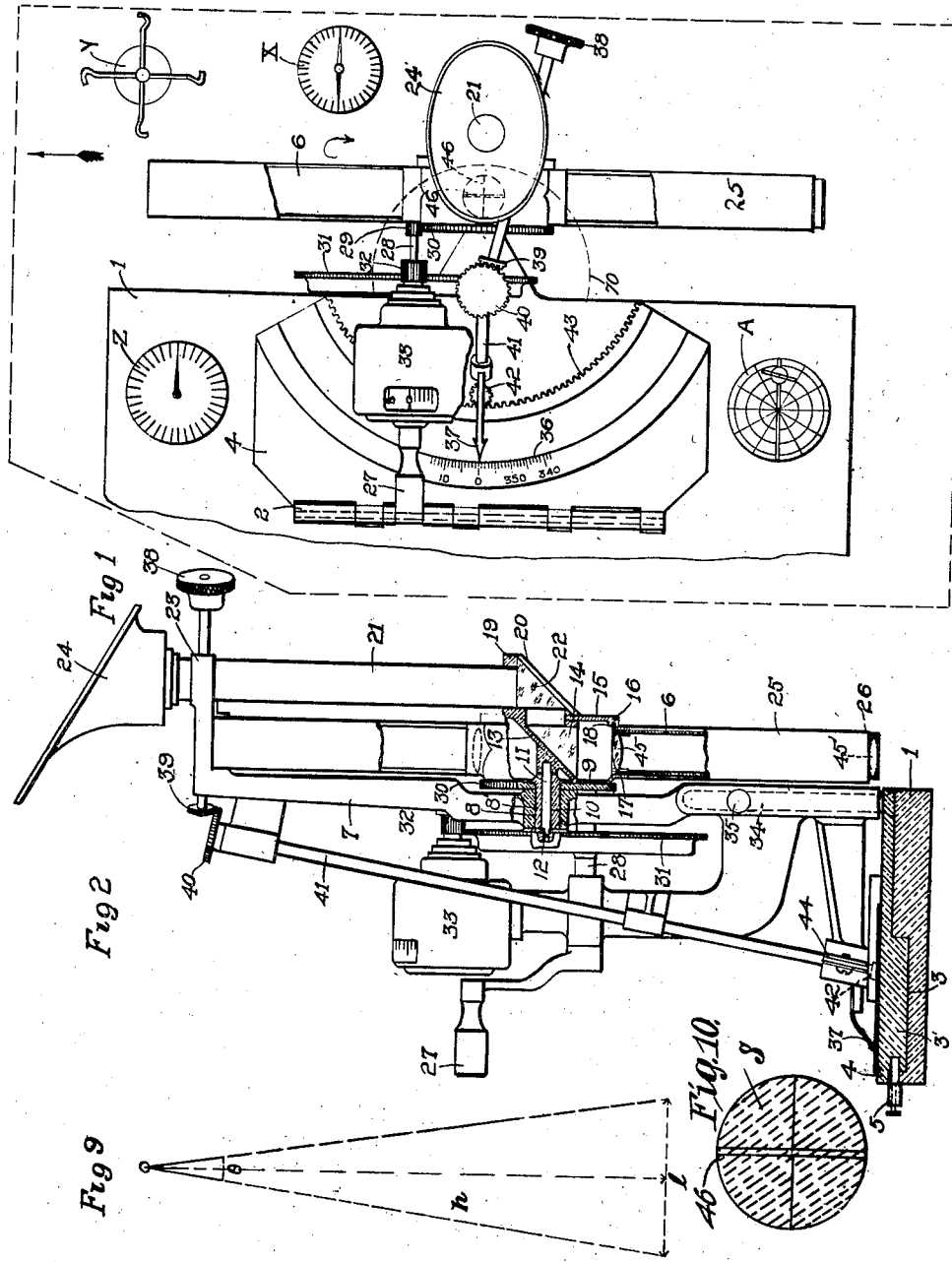
WITNESSES:
INVENTOR.
Elmer A. Sperry
BY Herbert H. Thompson
ATTORNEY.

E. A. SPERRY.
SPEED AND DIRECTION INDICATOR FOR AIRCRAFT.
APPLICATION FILED MAY 12, 1914.
1,274,622.
Patented Aug. 6, 1918.
2 SHEETS—SHEET 2.
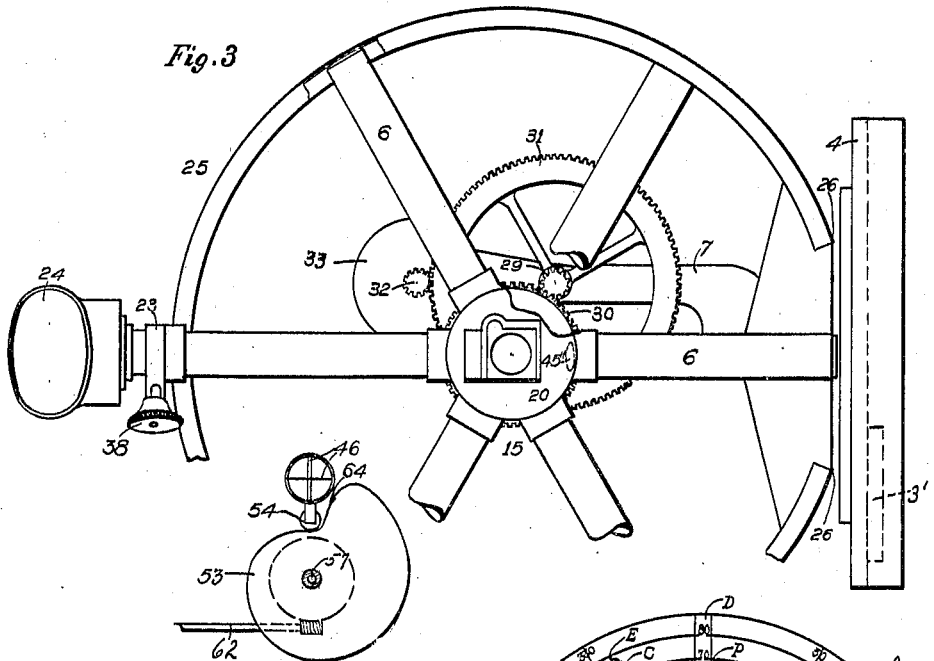
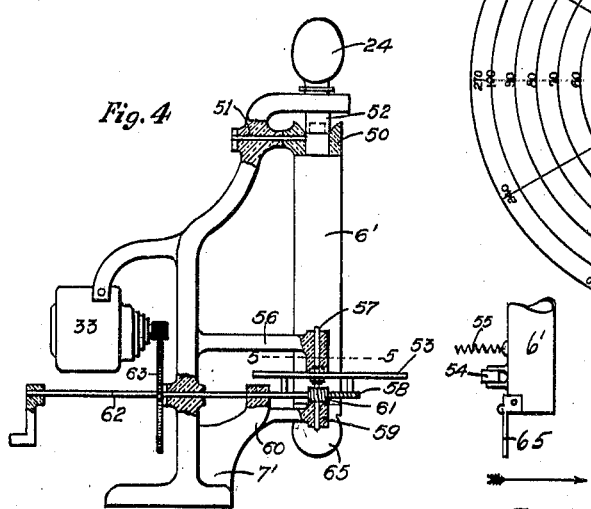
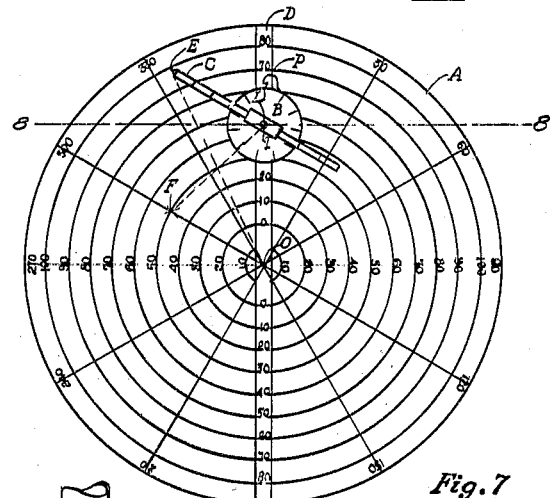
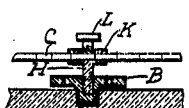
WITNESSES:
Charles H. Conner
L. J. Dibble
INVENTOR.
Elmer A. Sperry
BY Herbert H. Thompson
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

SPEED AND DIRECTION INDICATOR FOR AIRCRAFT.

1,274,622.   Specification of Letters Patent.   Patented Aug. 6, 1918.

Application filed May 12, 1914. Serial No. 838,060.

*To all whom it may concern:*

Be it known that I, ELMER A. SPERRY, a citizen of the United States, residing at Brooklyn, in the county of Kings and State of New York, have invented certain new Improvements in Speed and Direction Indicators for Aircraft, of which the following is a specification.

This invention relates to means for indicating either the true direction in which an aeroplane or other aircraft is moving or its true speed. The invention may be used also to determine simultaneously both the speed and direction of the aircraft, or in other words, its actual velocity with respect to the ground. Heretofore it has been impossible for an aviator to keep his course when flying over water or unfamiliar territory, since the vagaries of the wind quickly carry him far out of his course, without the aviator being aware of it. Also, as far as I am aware, no successful means has heretofore been devised whereby the aviator may determine the actual speed at which he is flying. The present invention supplies in one instrument both of these needs. It is not desired, however, to limit the use of this invention to air craft, as it is apparent that many other uses will suggest themselves to those skilled in the art. It may be used anywhere where it is desired to obtain the relative velocity of moving objects. Other objects of the invention will appear as the invention is described in detail.

Referring to the drawings:

Figure 1 is a plan view of one form of the invention, as it will appear on an aeroplane. Parts are broken away for clearness.

Fig. 2 is an end elevation, partly in section, of the same general form of the invention, but with a modified form of base.

Fig. 3 is a front elevation of Fig. 2, except that a slight modification in the mounting of the lenses on the tube is shown, the machine is also shown mounted on its side, so to speak, thus illustrating another use of the invention.

Fig. 4 is a side elevation of a modified form of the invention.

Figs. 5 and 6 are detail parts of the form shown in Fig. 4, Fig. 5 being a partial section on line 5—5, Fig. 4.

Fig. 7 is a plan view of the plotter which is used in connection with the main instrument.

Fig. 8 is a partial section on line 8—8, Fig. 7.

Fig. 9 is a diagram showing the theory of operation.

Fig. 10 is a representation of the field of vision seen through one of the telescopes, showing the appearance of the stream lines when the telescope is not placed exactly in the line of the line of flight of the air craft.

In Fig. 1 the dotted lines represent a portion of an aeroplane, which is provided with a hole 70 so that an unobstructed view of the earth may be obtained through the instrument. X, Y and Z are diagrammatic representations of a compass, an anemometer and an aneroid barometer, respectively, these instruments being shown as mounted on the main base plate 1. Also mounted on this base plate is a plotter A, which is hereinafter described in detail. The main instrument may be attached to the base in any suitable manner. Fig. 1 shows it hinged at 2 so as to swing back out of the way when not in use. Figs. 2 and 3 show a different form of connection. In these figures the base is provided with a circular recess 3. The bottom of the movable base 4 is provided with a boss which fits into the depression 3. This provides another means of swinging the instrument out of the way. A spring catch 5 is provided on base 1 to snap into a depression in boss 3', whereby the instrument may be held in a predetermined position when desired.

The instrument, proper, comprises essentially an angularly movable sight directing or object focusing means, illustrated in the main form of the invention as a plurality of revoluble sight pieces or tubes 6. These tubes are pivoted to the frame 7 at 8. Although not essential to the operation of the device, the tubes may be provided with suitable lenses 45, 45', to render the image of the ground more distinct. In Fig. 2 both lenses are shown as mounted in the tubes, but in Fig. 3 a single lens 45'' is shown as fixed to the plate 15, instead of having each tube provided with a lens. When equipped with lenses the tubes virtually constitute telescopes. The tubes may also be provided with some form of direction indicating means such as rectilinear lines extending across the field of vision typified by cross hairs 46, which aid in obtaining accurate results, as will be apparent as the description proceeds. The exact construction of the journal 8 and associated parts is as follows: The tubes are all secured near their inner ends to a rotatable plate 9 having an extended hub 8' and a central bore 10. This hub 8' is free to rotate in the bearing 8. Extending through the central bore 10 is a pin 11 which is secured to the frame 7 at 12 and is secured at its opposite end to a plate 13, which forms a support for prism 14 and is secured to a circular plate 15. This plate 15 excludes the light from the inner portion of the tubes and is formed with a grooved rim 16. The plate 9 is formed with an extension forming a holder 17 for the tubes. Formed on the holder is an annular flange 18 which is guided in groove 16. The circular plate 15 is formed with outwardly extending parts 19 and 20 which form, respectively, a support for the lower end of the fixed sighting tube 21 and a support for the prism 22. The tube 21 is supported at its upper end by an arm 23 of the frame 7.

A suitable form of eye-piece 24 may be secured to the upper end of tube 21. Means may be provided to exclude the light from the revolving tubes except when they approach the position where the line of sight extends. In the present embodiment of the invention this means consists of an annular casing 25 which is truncated at 26. This casing is secured in any convenient manner to the frame 7.

Means are provided whereby the tubes 6 may be rotated. As shown, the means comprises a handle 27 mounted on shaft 28 journaled in the frame 7. A pinion 29 on the shaft 28 meshes with a gear 30 secured to the boss 8. Also mounted on shaft 28 is a gear 31 which drives a pinion 32 on the tachometer 33, thus forming a means for indicating the rate of revolution or angular movement of the tubes. It will be noted that the gearing is so designed that the tachometer 33 will be driven at a much higher speed than the tubes 6, since in actual use the speed at which the tubes are rotated is comparatively slow.

The whole frame 7 is mounted on base 4 so as to be adjustable in a horizontal plane. A pivot pin 34 is secured to the base on which the frame swings. A set screw 35 may be provided to prevent the frame from lifting off the pivot. The angular position of the frame on the base is indicated by a scale 36 on the base and a pointer 37 on the frame. The zero graduation on scale 36 is preferably placed parallel to the fore and aft or lubber's line of the aircraft. Convenient and accurate adjustment of the frame is accomplished by means of the knob 38 which drives the pinion 39, which in turn meshes with gear 40 mounted on shaft 41, journaled on the frame. On the other end of shaft 41 is a pinion 42 which meshes with an annular rack 43 on the base 4. A clamp block 44 may be provided in one of the bearings of shaft 41, so that the frame will stay set in any position.

It is to be understood that the above description is merely illustrative of one form which my invention may assume and that it is capable of many modifications within the scope of the appended claims. One modification that illustrates well the different forms which my invention may assume is shown in Figs. 4 to 6.

As before stated, Fig. 3 shows that the instrument may be used on its side. When so used it can be trained on a fixed or moving object and will indicate the relative velocity of the object on which it is mounted and the object on which it is trained.

Referring now to Figs. 4, 5 and 6, the base and frame construction 7' is substantially the same as shown in Figs. 1, 2 and 3 and is not shown in detail. In this modification, a single sight piece 6' is employed which is mounted for angular motion on the frame by being suspended from a casting 50, mounted on a rod 51 which is journaled in the frame 7'. The eye-piece 24 may be connected to the upper end of the tube 6' by a piece of flexible tubing 52.

Motion is imparted to the tube 6' by any means which will give a comparatively slow, uniform angular movement in one direction and a quick return. A simple means of accomplishing this end consists of a properly designed cam 53 which bears directly against a roller 54 on the tube or telescope 6'. A spring 55 is provided to draw the roller against the cam, one end of the spring being secured to the tube and the other to an arm 56 extending from the frame 7'. The arm 56 also provides a bearing for the shaft 57 on which is mounted the cam 53 and worm wheel 58. The lower end of the shaft 57 is journaled in a thrust bearing 59 in a second arm 60. The hub of the worm wheel rests on top of bearing 59. The worm 61 which drives wheel 58 is mounted on shaft 62 journaled in the frame as shown. This shaft also carries a gear 63 which drives a pinion on the tachometer 33. Although not absolutely necessary to the successful operation of this form of the invention, means may be provided to shut off the vision through the telescope on its quick return stroke, that is while moving on that part of the cam marked 64 in Fig. 5. A simple means is illustrated on the drawing, which comprises a hinged flap 65, which depends for its operation merely on gravity and the motion of the telescope. It will readily be seen that as long as the telescope is moving slowly in the direction of the arrow in Fig. 6, or standing still, the flap will hang nearly vertical, but when the telescope is pulled suddenly forward by the spring 55 on the roller 54 reaching portion 64 of the cam, the inertia of the flap will cause it to swing up against the end of the telescope.

In Figs. 7 and 8 is illustrated an apparatus by means of which the readings obtained by the main instrument may be made use of to find directly the direction and velocity of the wind and the direction and speed in which the aviator should head. This consists of a disk A graduated in concentric circles to denote speed and also graduated in degrees. A groove D runs diametrically across the disk A and is also graduated to denote speed so that the center of the circularly graduated disk B will be on the proper circle when the pointer P reads a certain speed. This disk B is provided with a square projection G which slides in groove D and holds disk B from turning. Pivotally mounted in a tight bearing in the center of disk B is a rod H on which is mounted a horizontal bearing K, which slidably supports graduated pointed rod C. This rod is also graduated to denote speed and is adjustably held in its bearing by set screw L. The manner in which this instrument is used is described in detail hereinafter.

The theory on which the machine operates is as follows: If one looks downward through a tube as he moves over the surface of the earth, and turns the tube backward as he advances so that he can see the same spot, the distance $h$ (see Fig. 9) at which the tube is held above the earth together with the angle $\theta$ through which he rotates the tube in a time $t$ will give him the requisite data to calculate the distance $l$ he has moved in the time $t$, or in other words, his speed. If $h$ is kept constant, the angular velocity $\frac{d\theta}{dt}$ is the only variable, and for small angles the linear velocity is directly proportional to this variable. The tachometer provides a convenient means of measuring $\frac{d\theta}{dt}$, and it may be graduated so that when the machine is flying at 100 ft. elevation, for instance, it will read directly in miles per hour. A table may be provided for showing the speed when flying at a different height. The height may be readily determined by the aneroid barometer Z or by any other means. If the tubes are not being rotated at the right speed, the earth will appear to the observer to be slipping out from under him, and will form what may be termed stream lines S (see Fig. 10). If the aviator is being carried off his course by the air currents, the instrument will at once show this, since the stream lines will appear to move side-wise across the tubes. The lines or cross hairs 46, especially those extending in the direction in which the areo is pointing, aid in detecting this side drift. By turning the frame 7 until the side drift is eliminate, that is until the longitudinally extending hairs coincide with the direction of travel of the aeroplane the aviator may at once determine his true direction and speed of his flight and the angle which it makes with his apparent direction will be shown on scale 36. He can then change his course so that he is flying in the desired direction without side drift. This may be done by trial or it may be done by first determining, by means of a plotter A described above, the direction in which he must head and the anemometer speed which he must make.

It should here be noted that for the successful operation of my device it is not necessary that the sight tube be pointed vertically downward, since it may be inclined at any suitable angle. The line $h$ would then not be true height but would be equal to $h'$ sec $x$, where $h'$=the true height and $x$ the fixed angle of the tube with the vertical.

One method of using the plotter A both to determine the direction and speed of the wind, and the direction in which he must apparently head and the speed at which he must fly, is as follows:

First the sliding dial B is moved out so that the pointer P indicates on the scale on groove D the speed indicated by the aviator's anemometer. Then a point E is located on the dial A such that its distance from O equals the reading of the velocity indicator 33 and such that the angle it subtends with the groove D equals the angle shown by the scale 36. Then rod C is extended to E. The reading on dial B will give the direction of the wind and the extension of the rod will give its speed. To obtain the other factors move the dial B down to O, keeping the rod C fixed and locate a point F at its end. Then move dial B back to the position formerly occupied, if that is the actual speed the aviator wishes to make, and extend rod C to point F, as indicated by dotted line F—I. The extension of the rod will give the speed he must make through the air and the supplement of the angle shown on dial B will give the direction in which he must head. That is, he must head in the opposite direction from that indicated by pointer C.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Of course, it is obvious that the invention is capable of many other uses than herein specifically pointed out. When obtaining the direction,—or, in other words, the side drift of the aeroplane, it is of course not necessary to rotate or oscillate the sight tubes, said tubes being employed in the manner of a telescope, and the stream lines being observed as they cross the field of vision of the telescope. Furthermore, it is not necessary that the tube be moved parallel to the longitudinal axis of the aircraft in order to obtain the velocity of the aircraft, if the angle which the plane of movement makes to the said axis is known. For instance, let us suppose the apparatus shown in Fig. 4 is placed so that the tube moves at right angles to the actual direction of flight of the aircraft as observed through the telescope and that the handle 27' is rotated at a known velocity and with the aircraft at a known height. Observation through the tube then will show the stream lines S crossing the field of vision of the telescope at a certain angle. If the height at which the aeroplane is flying is known and the said angle is estimated, it will be readily seen that the speed of the aeroplane may be at once determined by resolution of vectors since the velocity of the rotation of the tube is also known.

Having described my invention, what I claim and desire to secure by Letters Patent is:—

1. A means for indicating both the direction and speed of moving vehicles, comprising a frame adapted to be pivotally secured to the vehicle and to pivot in a horizontal plane and a sight piece mounted for variable angular movement on said frame, an indicator and scale coöperating with said frame to show the angular position of the frame with respect to the vehicle and an indicator connected to the sight piece to show the angular velocity of said sight piece.

2. A means for indicating the true direction in which an air craft is moving, comprising a base adapted to be attached to the air craft, a frame horizontally pivoted on said base and a sight piece mounted on said frame for variable angular movement in a plane at an angle to the horizontal and an indicator and scale coöperating with said frame to show the angular position of the frame and sight piece with respect to the air craft.

3. A means for indicating the true direction in which an air craft is moving, comprising a base adapted to be attached to the air craft, a frame horizontally pivoted on said base and a sight piece mounted on said frame for variable angular movement in a plane at an angle to the horizontal, a sight hair mounted in said sight piece, which lies in the plane of angular movement of said sight piece, whereby side drift of the air craft may be observed and an indicator and scale coöperating with said frame to show the angular position of the frame and sight piece with respect to the air craft.

4. A means for indicating the true direction in which an air craft is moving, comprising a base adapted to be attached to the air craft, a frame horizontally pivoted on said base and an object focusing device mounted on said frame for variable angular movement in a plane at an angle to the horizontal, means to revolve said frame with the device on said base and separate means to impart angular motion to said device, and an indicator and scale coöperating with said frame to show the angular position of the frame and device with respect to the air craft.

5. A means for indicating the true direction in which an air craft is moving, comprising a base adapted to be attached to the air craft, a frame horizontally pivoted on said base and a sight piece mounted on said frame for variable angular movement in a plane at an angle to the horizontal, a sight hair mounted in said sight piece whereby side drift of the craft may be determined, means to revolve said frame on said base and separate means to impart angular motion to said sight piece, and an indicator and scale coöperating with said frame to show the angular position of the frame and sight piece with respect to the air craft.

6. A speed indicator for measuring the relative linear velocity of two or more objects, comprising a frame, a sight tube mounted for variable angular movement on said frame, an indicator connected to said tube to show its angular velocity and means to impart angular movement to said sight tube.

7. A speed indicator for measuring the relative linear velocity of two or more objects, comprising a frame, a sight tube mounted for variable angular movement on said frame, cross hairs mounted in said tube whereby relative motion between the image viewed through the tube and the tube may be determined, an indicator connected to said tube to show its angular velocity and means to impart angular movement to said sight tube.

8. A means for indicating both the true direction and speed at which an air craft is traveling, comprising a base attached to the air craft, a frame horizontally pivoted on said base and a sight directing means mounted on said frame for variable angular movement in a plane at an angle to the horizontal, an indicator and scale coöperating with said frame to show its angular position with respect to said craft and an indicator connected to said sight means to show its angular velocity.

9. A means for indicating both the true direction and speed at which an air craft is traveling, comprising a base attached to the air craft, a frame horizontally pivoted on said base, a telescope with its eye piece adjacent the center of rotation mounted on said frame for variable angular movement in a plane at an angle to the horizontal, an indicator and scale coöperating with said frame to show its angular position with respect to said craft and an indicator connected to said telescope to show its angular velocity.

10. A means for indicating both the true direction and speed at which an air craft is traveling, comprising a base attached to the air craft, a frame horizontally pivoted on said base, a telescope with its eye piece adjacent the center of rotation mounted on said frame for variable angular movement in a plane at an angle to the horizontal, cross hairs mounted in said telescope whereby both the side drift and the linear speed in the direction of flight may be observed, an indicator and scale coöperating with said frame to show its angular position with respect to said craft and an indicator connected to said telescope to show its angular velocity.

11. A velocity indicator for moving vehicles, comprising a frame and a tube pivotally mounted on said frame, means to impart relatively slow, uniform angular motion to said tube in one direction and to impart a quick return motion, and means to indicate the velocity of the first mentioned motion.

12. A velocity indicator for moving vehicles, comprising a frame and a tube pivotally mounted on said frame, means to impart relatively slow, uniform angular motion to said tube in one direction and to impart a quick return motion, a shutter controlled by the motion of the tube and operating to close its end on the return motion of the tube, and means to indicate the velocity of the first mentioned motion.

13. An instrument whereby the actual speed of an air craft with respect to the earth may be determined, comprising a base frame, a sight tube mounted for variable angular movement on said frame in a plane at an angle to the horizontal, a speed indicator connected to said tube and means whereby the tube may be moved at a uniform velocity.

14. An instrument whereby the actual speed of an air craft with respect to the earth may be determined, comprising a base frame, a sight tube mounted for variable angular movement on said frame in a plane at an angle to the horizontal, means to exclude the light from the tube during a predetermined portion of its movement, a speed indicator connected to said tube and means whereby the tube may be moved at a uniform velocity.

15. A means for indicating the true direction in which an air craft is moving, comprising a base adapted to be attached to the air craft, a frame horizontally pivoted on said base and an object focusing device mounted on said frame for variable angular movement in a plane at an angle to the horizontal, means to exclude the light from the device during a predetermined portion of its movement, and an indicator and scale coöperating with said frame to show the angular position of the frame and sight device with respect to the air craft.

16. An instrument for measuring the speed of a moving object with respect to a reference surface, said instrument being adapted to be placed on the object at a distance from the reference surface, comprising a frame and an angularly movable sight tube mounted on said frame and means by which the rate of angular movement of said tube may be determined.

17. An instrument for measuring the speed of a moving vehicle, adapted to be placed on said vehicle at a distance from the earth, comprising a frame, an angularly movable telescope mounted on said frame, a sight hair mounted in said telescope, means by which the angular velocity of the telescope is indicated and means by which uniform angular motion may be imparted to the telescope.

18. An instrument for measuring the relative speed of moving objects, adapted to be placed on one of said objects at a distance from the other, comprising a frame, a sight tube mounted for angular movement on said frame, means whereby the light is excluded from the tube during a predetermined part of its movement and means to indicate the velocity of the tube.

19. An instrument for measuring the relative speed of moving objects, adapted to be placed on one of said objects at a distance from the other, comprising a frame, an object focusing device mounted for angular movement on said frame, rectilinear lines mounted in the field of vision of said device, means whereby the light is excluded from said device during a predetermined part of its movement and means to indicate the velocity of the device.

20. An instrument for indicating the side drift of an air craft, comprising a base, a frame pivoted on said base so as to rotate in a horizontal plane, a sight piece mounted for angular movement on said frame in a plane at an angle to the horizontal and means to exclude the light from the sight piece during a predetermined portion of its movement.

21. An instrument for indicating the side drift of an air craft, comprising a base, a frame pivoted on said base so as to rotate in a horizontal plane, a sight piece mounted for angular movement on said frame in a plane at an angle to the horizontal, means to exclude the light from the sight piece during a predetermined portion of its movement and an indicator connected to said frame, whereby the angle of drift is shown.

22. An instrument for indicating the true velocity of an air craft, comprising a base, a frame rotatably mounted on said base so as to pivot horizontally, a sight piece mounted for angular movement in a plane at an angle to the horizontal on said frame, means for excluding the light from the piece except during a predetermined portion of their revolution, an indicator connected to said piece whereby its velocity is shown and an indicator connected to said frame, whereby the angle of drift is shown.

23. An instrument for indicating the side drift of an air craft, comprising a base, a frame pivoted on said base so as to rotate in a horizontal plane, one or more sight pieces mounted for angular movement on said frame in a plane at an angle to the horizontal, sight hairs mounted in said sight pieces, means to exclude the light from the sight pieces during a predetermined portion of their movement and an indicator connected to said frame, whereby the angle of drift is shown.

24. An instrument for indicating the speed of a moving vehicle, comprising a frame, a sight directing means mounted for angular movement on said frame whereby the line of sight may be directed at the same spot for an appreciable length of time, and means whereby the rate of movement may be indicated.

25. An instrument for indicating the side drift of an air craft, comprising a frame mounted for rotation in a horizontal plane, a direction indicating means mounted for angular movement on said frame about an axis at an angle to the horizontal, and an indicator to show the angular position of the frame.

26. An instrument for indicating both the direction and speed of an air craft, comprising a frame mounted for rotation in a horizontal plane, a sight directing means mounted for angular movement on said frame at an angle to the horizontal, means whereby the velocity of the sight directing means may be indicated, and an indicator to show the angular position of the frame.

27. A drift machine for air craft comprising a base, direction indicating means adjustably mounted on said base adapted to be turned parallel to the true course of the air craft and angle measuring means associated with said means.

28. A drift machine for air craft comprising an object focusing piece, a line in the field of vision of said piece, means whereby said line may be brought into coincidence with the line of flight of said craft, and an indicator connected to said piece to show the angle that the line makes with the lubber's line of the air craft.

29. A drift machine for air craft comprising a telescope supported in a substantially vertical position, a line in the field of vision of said telescope, means whereby said line may be brought into coincidence with the line of flight of the air craft, and an indicator on said telescope to show the angle that the line makes with the lubber's line of the craft.

30. A speed indicator for moving vehicles comprising a frame, and object focusing means mounted for variable angular movement on said frame, whereby the said object may be kept in focus for a predetermined length of time.

In testimony whereof I affix my signature in presence of two witnesses.

ELMER A. SPERRY.

Witnesses:
CHARLES H. CONNER,
ALBERT W. STRINGHAM.